United States Patent
Marszalec et al.

(10) Patent No.: US 6,871,675 B1
(45) Date of Patent: Mar. 29, 2005

(54) COUNTERTOP WATER DISPENSER

(75) Inventors: Michael S. Marszalec, Freeport, IL (US); Lowell Burnham, Freeport, IL (US); Michael T. Kopczewski, Grove City, OH (US); Jay F. Perkins, Pickerington, OH (US); Rafael M. Rodriguez, Ormond Beach, FL (US); Chun-Yen Wang, Daytona Beach, FL (US); Wen Li, Foshan (CN); Xiaolin Wu, Foshan (CN); Yanxiang Xu, Foshan (CN); Yong Nie, Foshan (CN); Bo Huang, Foshan (CN)

(73) Assignee: The Brita Products Company, Oakland, CA (US)

( * ) Notice: Subject to any disclaimer, the term of this patent is extended or adjusted under 35 U.S.C. 154(b) by 0 days.

(21) Appl. No.: 10/692,944

(22) Filed: Oct. 24, 2003

(51) Int. Cl.[7] ............................................... B65B 1/04
(52) U.S. Cl. .................... 141/82; 222/146.1; 222/185.1
(58) Field of Search ........................... 141/82, 98, 351; 222/146.1–146, 185.1

(56) References Cited

U.S. PATENT DOCUMENTS

| | | | |
|---|---|---|---|
| 4,958,747 A | * | 9/1990 | Sheets .......................... 222/67 |
| 4,969,996 A | | 11/1990 | Hankammer |
| 5,063,926 A | | 11/1991 | Forsgren et al. |
| 5,289,855 A | | 3/1994 | Baker |
| 5,439,145 A | | 8/1995 | Salkeld et al |
| 5,470,044 A | | 11/1995 | Chi . |
| 5,544,489 A | | 8/1996 | Moren |
| 5,647,416 A | | 7/1997 | Desrosiers |
| 5,695,094 A | * | 12/1997 | Burnham et al. ........ 222/146.1 |
| 5,730,863 A | | 3/1998 | Howlings |
| 5,771,709 A | * | 6/1998 | Smith ........................ 62/389 |
| 6,153,111 A | | 11/2000 | Conrad et al. |
| 6,179,168 B1 | | 1/2001 | Desrosiers |
| 6,312,588 B1 | | 11/2001 | Conrad et al. |
| 6,354,344 B1 | | 3/2002 | Pluta et al. |
| 6,443,334 B1 | * | 9/2002 | John et al. ............... 222/464.3 |
| 6,786,255 B1 | * | 9/2004 | Lee ............................ 141/351 |

OTHER PUBLICATIONS www.sdfuxin.com/cp–zhujion.html, (no date) Fuxin Product Guide (re thermoelectric module).
PureSmart™ Filterd Drinking Water System, Installation and Operation, Aug. 30, 2002/ www.ehydrated.com.

* cited by examiner

*Primary Examiner*—Steven O. Douglas
(74) *Attorney, Agent, or Firm*—Michael P. Mazza; Michael J. Mazza (57) ABSTRACT

A compact, countertop water dispenser preferably dispensing ambient, chilled or hot water, and preferably allowing single-hand dispensing of ambient and child water, as well as child-resistant hot water dispensing. In one embodiment, powered by thermoelectrics, a side-mounted water container feeds a first reservoir, which feeds a second reservoir in liquid communication with hot and cold tanks. Predetermined reservoir water levels may be maintained by float switches and solenoid valves may be used to enable/disable water flow from the tanks and dispensing. Many other features are provided as described below.

23 Claims, 13 Drawing Sheets

(COLOR CODED)
69d

FIG. 9A

SLIDE AND PUSH

(COLOR CODED)

FINGER HOLE
69e

FIG. 10A

FINGER LIFTS UP
69e
GRAVITY CLOSES (OR SPRING)

COUNTERTOP WATER DISPENSER

BACKGROUND OF THE INVENTION

The present invention generally relates to the dispensing of filtered, bottled water within enclosed spaces. More specifically, the invention relates to a filtered water dispenser suitable for use in an enclosed space envelope, such as on a kitchen countertop, which preferably provides ambient, cold and hot temperature, filtered water.

It is desirable to provide an affordable countertop water dispenser with a preferred height less than about 24 inches, and in a particularly preferred embodiment less than about 18 inches. Preferably, the dispenser is located adjacent a replenishable water source such as a water bottle, and may provide filtered, chilled, hot or room temperature water. The replenishable water source preferably has a volumetric capacity allowing easy handling (e.g., 1–3 gallons). An efficient and compact cooling system, such as thermal electrics, is also preferably provided. It would also be desirable to provide a dispenser with various additional features, including: an easy-carry handle for the water container, an ergonomic appliance size and feel; one-hand touch dispensing controls; safety feature for child-resistant control over hot water dispensing; temperature indicators; and selfcontained dispenser shutoff, and a filter cartridge which may be easily replaced when a monitor indicates that the filter has reached the end of its useful life; antibacterial control; and conformance with applicable regulations, including UL, NSF, CE and CUL.

These and other advantages may be provided by the countertop dispenser of the present invention, as further described below.

DEFINITION OF CLAIM TERMS

The following terms are used in the claims of the patent as filed and are intended to have their broadest meaning consistent with the requirements of law. Where alternative meanings are possible, the broadest meaning is intended. All words used in the claims are intended to be used in the normal, customary usage of grammar and the English language.

"Automatic filter shutoff device" means a device in fluid communication with a water container which filters water and then interferes with the ability to dispense water from the container after a predetermined amount of water usage (i.e., the "shutoff" feature), which may generally correspond to the useable life of the filter, has been reached. "Automatic" in this context means that shutoff occurs without the need for user intervention to trigger shutoff, such as without the need for the user to respond to a visual or audible signal from a filter monitor. An example of such a device which may be used in conjunction with the present invention is disclosed in U.S. Pat. No. 6,354,344, titled "Automatic Shutoff Device For Filtered Bottle Water Dispenser," whose disclosure is incorporated by reference in its entirety into this application.

"Countertop height" means any then-industry standard height(s) between a kitchen countertop and kitchen cabinets. Currently, the "countertop height" in the U.S. is about eighteen (18) inches.

"Countertop dimensions" refers to a countertop dispenser unit having suitable length, width and height dimensions such that the unit has a size envelope and footprint enabling it to be located within and between an industry-standard kitchen countertop and an industry-standard kitchen cabinet.

"Child-resistant actuator" means an actuation mechanism, such as but not limited to mechanisms consisting of buttons and/or slides, permitting hot water dispensing while providing a measure of security against undesirable dispensing by children. "Child-resistant manner of dispensing" means dispensing using a "child-resistant actuator."

SUMMARY OF THE INVENTION

The objects mentioned above, as well as other objects, are solved by the present invention, which overcomes disadvantages of prior water dispensers, while providing new advantages not believed associated with such devices, including those advantages listed above as well as other advantages as well.

In one preferred embodiment, a water dispenser includes a first reservoir in liquid communication with a water container which is mounted on the side of the dispenser. A second reservoir is provided which is in liquid communication with the first reservoir. The second reservoir is also in liquid communication with each of a hot tank and a cold tank. The second reservoir may include two separate reservoirs (e.g., reservoir 40a, 40b). One of the reservoir (e.g., reservoir 40b) may be separated into separate compartments using a baffle. The other of the reservoirs (e.g., reservoir 40a) may receive steam or expanded hot water from the hot tank. Water from the second reservoir fills and replenishes the hot and cold tanks. A dispensing mechanism for dispensing hot water using a child-resistant actuator is provided. Alternatively, the dispensing mechanism maybe capable of selectively dispensing chilled, ambient or hot water, or any variation of these (e.g., ambient and chilled only, ambient and hot only, chilled and hot only, etc.). Preferably, the water dispenser has countertop dimensions, including a countertop height.

Preferably, the dispensing mechanism is capable of dispensing ambient or chilled water using a single hand, i.e., "single touch" dispensing. However, because of safety issues involved in dispensing hot water, it is desirable to only allow hot water dispensing in a child-resistant manner, such as using a child-resistant actuator which requires two hands, or which requires different and/or separate movements by a single hand (e.g., push and slide, etc.).

Although not required, the water dispenser of the present invention may be provided with a filter, such as an automatic filter shutoff device which may be used to sense water containers with differing volumetric capacities and adjusts its shutoff capabilities accordingly.

A fan may be located at the rear of the dispenser for use in removing heat from the dispenser. The speed of the fan may be varied or modulated (e.g., from 2200 RPM down to 750 RPM and then back to 2200 RPM) around a set point temperature range (e.g., 2° F.) to facilitate maintaining the water in the cold tank within a desired range. Preferably, continuous cycling is provided.

Preferably, the dispenser includes a cooling system powered by a thermoelectric device. It is also preferred to provide separate switches for energizing heating and cooling systems within the dispenser, enabling dispensing of chilled (and/or ambient) water without energizing the heating system, and enabling dispensing of hot (and/or ambient) water without energizing the cooling system.

A check valve may be used, positioned in liquid communication between the hot tank and the second reservoir, to help prevent hot water from flowing from the hot tank back into the second reservoir. Solenoid valves may be used for selectively enabling and disabling the flow of water from the hot and cold tanks. Float/level switches may be used to maintain sufficient water levels in the reservoirs and tanks, and to prevent pump cavitation.

Preferably, the cold tank includes a baffle facilitating the separation of hotter and colder water within the tank, and helping to minimize water turbulence within the tank. It is also desirable to include a baffle within the second reservoir, for separating water flowing into the cold tank and water flowing into the hot tank, facilitating the provision of cold tank water inlet temperatures which are closer to ambient temperatures than would otherwise be the case without a baffle.

In another aspect of the invention, a process is provided for dispensing water from a dispenser unit having countertop dimensions, including a countertop height, and located on a countertop. First, the countertop dispenser unit is powered/ energized, and a water container, such as a water bottle, is placed in liquid communication with a first reservoir. A second reservoir is placed in liquid communication with the first reservoir, and with each of a hot tank and a cold tank. The hot and cold tanks are then filled with water supplied from the second reservoir. The second reservoir is then filled to a predetermined level with water supplied from the first reservoir. A predetermined amount of water is preferably maintained within the first and second reservoirs during dispensing; this may be accomplished using float/level switches, for example. Child-resistant dispensing of hot water is enabled using a child-resistant actuator. In one preferred embodiment, a fan may be used for removing heat from the dispenser. Fan speed may be modulated around a set point temperature range to facilitate maintaining the water in the cold tank within a desired temperature range in an energy-efficient manner. Preferably, the fan continuously cycles when the dispenser unit is energized.

In one embodiment, steam or hot water expansion from the hot tank is released into one portion of the second reservoir. Preferably, though not necessarily, the water container is mounted on a side adjacent the dispenser.

BRIEF DESCRIPTION OF THE DRAWINGS

The novel features which are characteristic of the invention are set forth in the appended claims. The invention itself, however, together with further objects and attendant advantages thereof, will be best understood by reference to the following description taken in connection with the accompanying drawings. The drawings illustrate currently preferred embodiments of the present invention. As further explained below, it will be understood that other embodiments, not shown in the drawings, also fall within the spirit and scope of the invention.

DETAILED DESCRIPTION OF THE PREFERRED EMBODIMENTS

Set forth below is a description of what are currently believed to be the preferred embodiments and/or best examples of the invention claimed. Future and present alternatives and modifications to these preferred embodiments are contemplated. Any alternatives or modifications which make insubstantial changes in function, in purpose, in structure or in result are intended to be covered by the claims of this patent.

Figure 1:
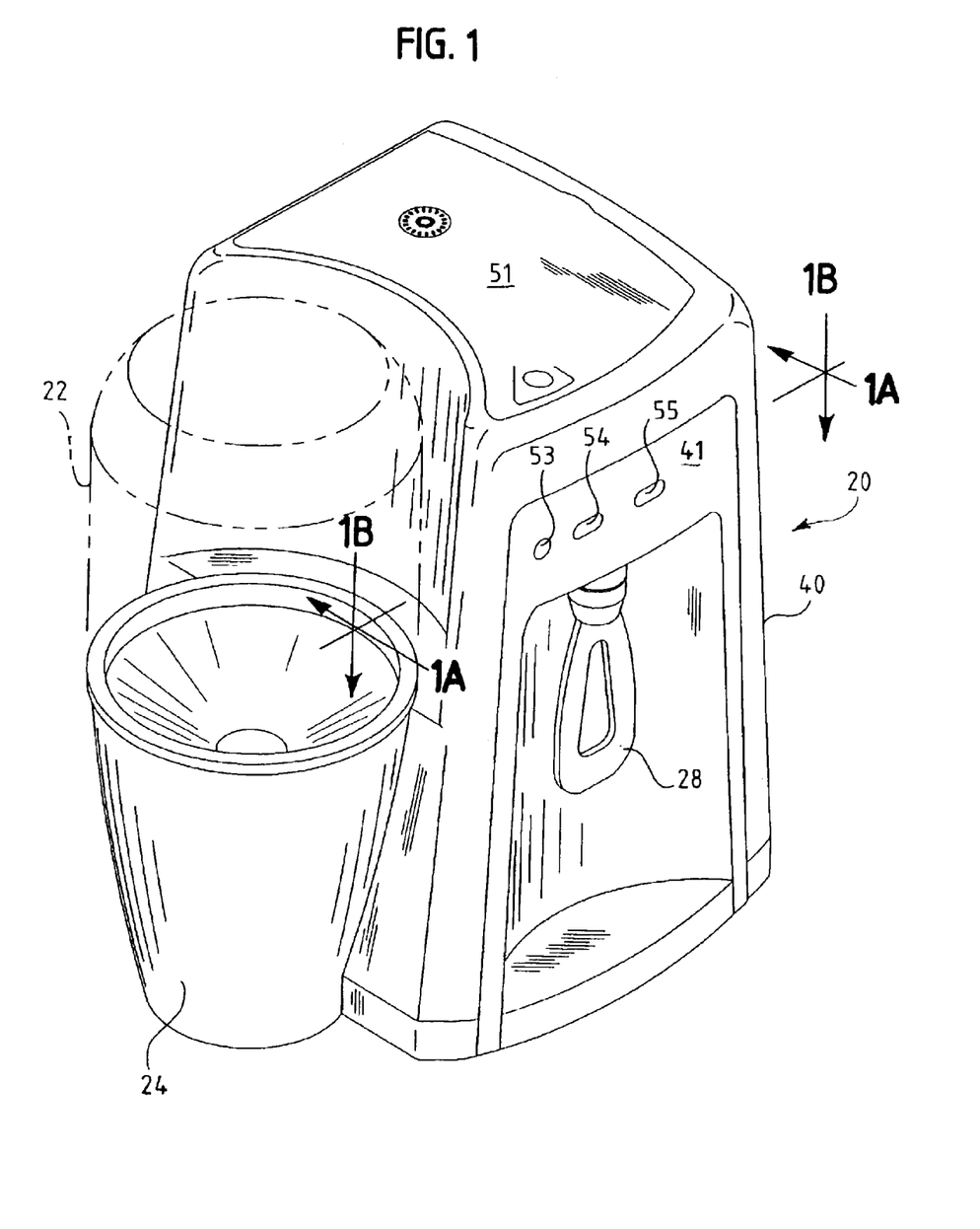
FIG. 1 is a top and side perspective view of a countertop dispenser unit according to one preferred embodiment of the present invention.
Figure 2:
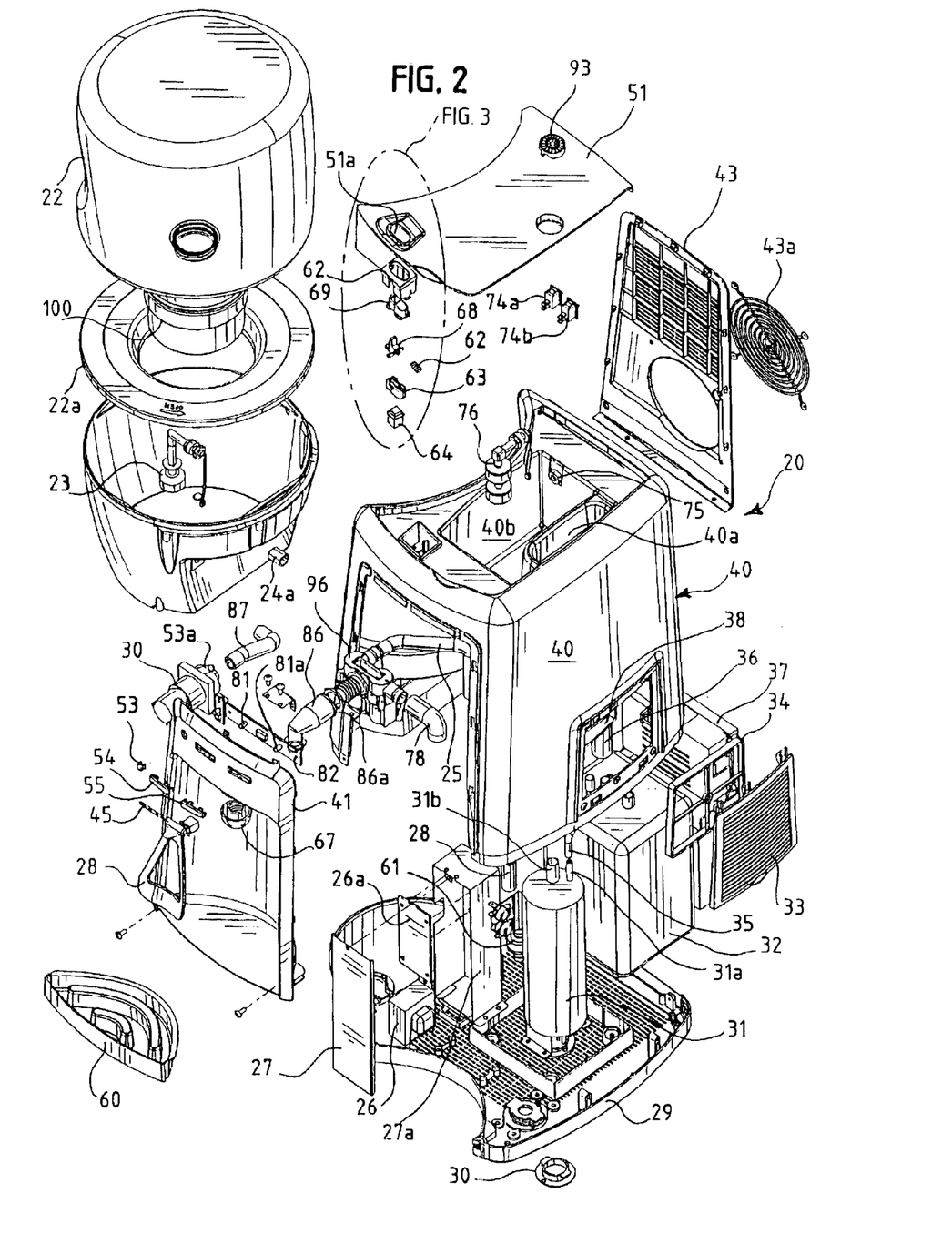
FIG. 2 is a perspective, parts view of the components forming the countertop dispenser unit shown in FIG. 1.

Referring first to FIG. 1, a preferred embodiment of the countertop dispenser of the present invention is generally designated by reference numeral 20. Countertop dispenser 20 may include a first reservoir 24 supporting a water bottle container 22, shown in dotted lines. Threaded bottle ring 22a is designed to engage with mating threads on the upper portion of lower reservoir 24, and has an inner aperture sized to accommodate filter 100 (FIG. 2). Filter/shutoff device 100 engages the bottle neck (not shown), and its purpose is described below. Immediately adjacent reservoir 24 is dispenser wrapper 40. Wrapper 40 has an alcove/front face 41 containing dispensing lever 28 (attached via pin 45) and drip tray 60 (FIG. 2), within which a glass may be placed for filling with ambient, chilled or hot water, which is provided as further described below.

Referring now to FIG. 2, dispenser wrapper 40 includes upper cover 51, rear panel 43 with fan grill 43a, dust cover 33 and dust filter 34 and base 29 and drain hole cover. Within wrapper 40 is included PCB (electronic board) enclosure cover 27, PCB enclosure 27a, PCB board 26a, transformer 26, hot tank inlet hose 28, hot tank 31, hot tank venting hose 35, check valve 61, cold tank 32, cold tank inlet hose 36, filter housing 38, seal ring 75, second reservoir level switch 76, switch power PCB 37, and switches 74a, 74b. Spout cover 67 may be provided in selective liquid communication with pump inlet hose 87 and pump 30, as well as with spout 86 and seal ring 86a. Spout 86, in turn, may be provided in selective liquid communication with cold tank outlet hose 25 and hot tank outlet hose 28, each of which communicate with solenoid valve 96. In operation, and still referring to FIG. 2, countertop dispensing unit 20 may be powered by plugging into a wall socket, for example, although other power supplies (e.g., battery) may be provided. Once power is provided to the unit, power indicator 53 energizes (e.g., to a green color). Switches 74a and 74b may be activated separately, as each provides power to the cooling and heating systems, respectively. In this way, if only cold water is desired, it is efficient to leave the heating systems deactivated, and vice-versa. (Alternatively, in a dispensing system that provides ambient, cold and hot water, if the heating system is deactivated, the unit can provide ambient and cold water.)

Referring to FIG. 2, during initial set-up, bottle 22 (e.g., a 2-gallon bottle) filled with water is placed in liquid communication with lower reservoir 24. Initially, with pump 30 energized, water is permitted to flow from bottle 22 into lower reservoir 24, then through suction tube 24a into upper reservoirs 40b, and then into cold tank 32 and hot tank 31. Float switch 76 in upper reservoir 40b causes water to continue to be pumped to the upper reservoir until cold tank 32 and hot tank 31 are filled. Once these tanks are full, upper reservoirs 40a and 40b begin to fill, until a sufficient level is reached; when level switch 76 reaches a predetermined level, it then moves to a "down" position, disabling the pump. Countertop unit 20 is now ready for dispensing.

During continued dispensing, assuming there is enough water in bottle 22, the level in the upper reservoirs 40a and 40b is controlled by float switch 76, which also controls the water level in lower reservoir 24. Float switch 23 prevents pump 30 from cavitating. When float switch 23 is in the "up" position, this prevents further water from reaching reservoir 24 from bottle 22.

Still referring to FIG. 2, a thermistor (not shown) is connected to controller 37, and preferably cools the water within cold tank 32 until the set point is reached (e.g., about 0°–6° C.). Cold-water and hot-water solenoids 96 are each normally de-energized (closed). Depressing lever 28 by (e.g.) pushing a glass to be filled against it activates the default mode for cold water; right-hand side blue light indicator 81a on PCB board 82 will energize, causing blue indicator 55 (which may be an LED or other convenient light source) to light. (Power indicator lights 53a, 81 and 81 may each be located on PCB board 82.) Depressing lever 28 activates a microswitch (not shown) behind pin 45, energizing the cold water solenoid 96, and beginning a draw of cold water from cold tank 31. This diminishes the water supply in upper reservoir 40b, requiring replenishing, which will occur from reservoir 24 until float switch 76 disables pump 30.

Cold temperature cycling may be adjusted by adjusting fan speed, which may run at (e.g.) 2200–2700 RPMs, preventing freezing within the cold tank and extending the life of the unit.

To obtain hot water, the user depresses lever 28 and also activates and hold child-resistant button/switch 64 (as further explained below), energizing hot water solenoid 96. This energizes the (e.g., red) hot light indicators 81/54, and also begins flow from upper reservoir 40b into hot water tank 31. This flow continues until both the hot water tank and then the upper reservoir reach sufficient levels, at which time pump 30 is disabled by float switch 76.

Figure 3:
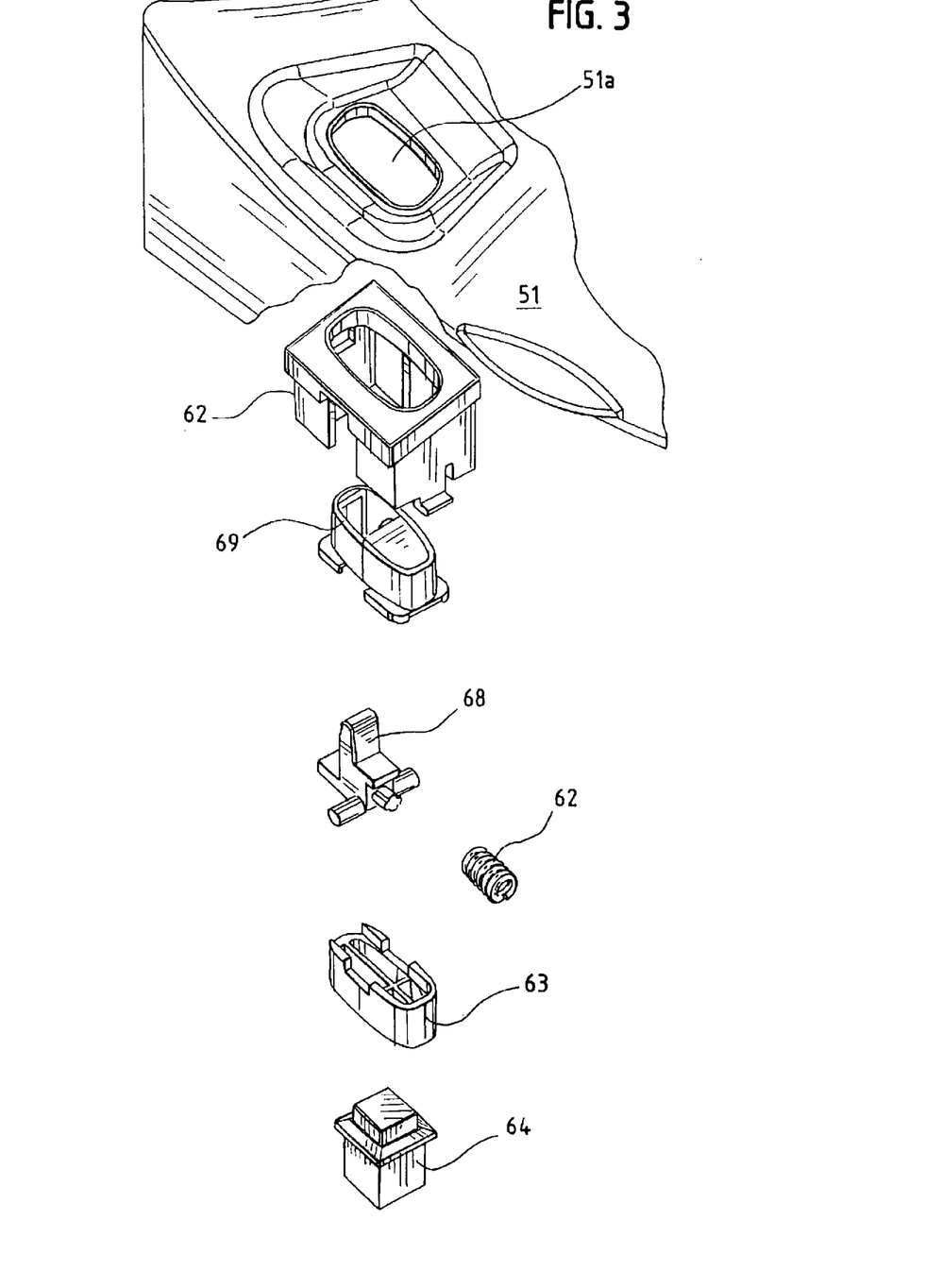
FIG. 3 is an enlarged perspective view of the components within the portion circled in FIG. 2.

Referring now to FIG. 3, microswitch 64 controls actuation of child-resistant button 69. Microswitch 64 fits within lower slide guide 63, and is attached to slide switch 68 by spring 62. Child resistant button 69 fits within bezel 62 which may snap-fit within aperture 51 a of upper cover Referring back to FIG. 2, the valve system is preferably designed to maximize air flow. Hot tank inlet (not shown) runs from check valve 61 into hot tank 31. Hot tank outlet 31b connects to hot tank outlet hose 78 and then to solenoid 96. Hot tank 31 may employ a standard heating element, using bimetal control and cutoff switches. As water within the hot tank heats, pressure increases within the tank; check valve 61 prevents hot water from returning to upper reservoir 40b. Steam or hot water expansion from hot tank 31 is released into upper reservoir 40a through vent tube 31a and then venting hose 35. Ideally, water within reservoir 40b is maintained at about room temperature for optimum energy efficiency, since both hot and cold water tanks draw from this source. Venting cover 93 on top lid 51 may be used to allow steam to be released to the atmosphere.

Figure 4:
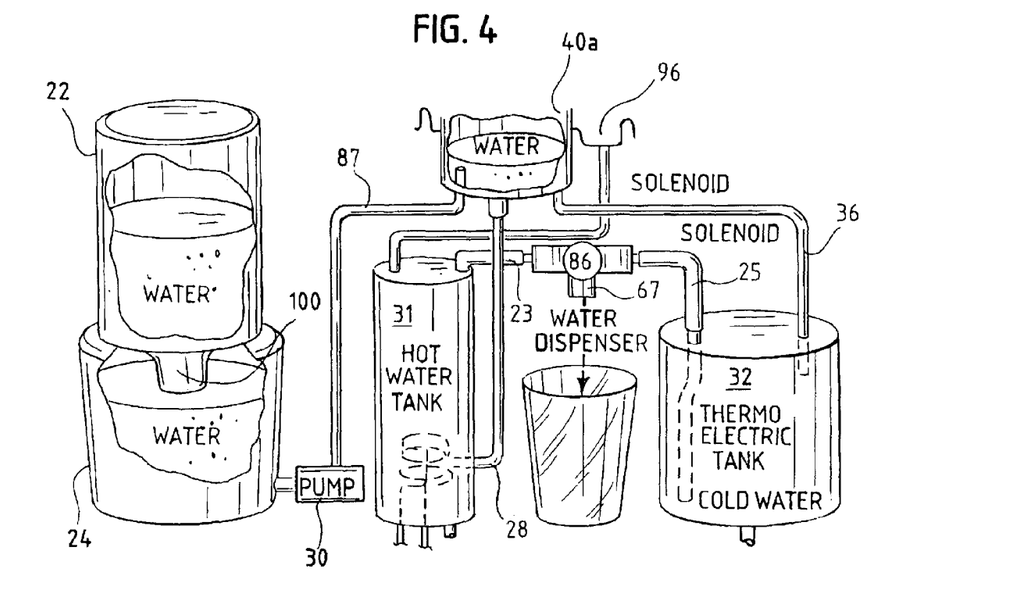
FIG. 4 is a schematic view of showing one preferred water layout for use with the countertop dispenser unit.

Referring now to FIG. 4, a preferred, compact layout for providing ambient, chilled or hot water dispensing is provided. In this embodiment, ambient water is dispensed from water bottle 22 to first/ambient reservoir 24 via filter/shutoff device 100. Pump 30 brings the water, at an ambient temperature, to a second reservoir 40a, an expansion chamber separated from reservoir 40b (minimizing reservoir 40a's hot water impact on colder water within reservoir 40b), within wrapper 40. Solenoid valve 96 takes water from the cold tank or the hot tank and delivers that water to spout 86, via cold tank outlet hose 25 and hot tank outlet hose 78, respectively. Alternatively, the unit may be designed for dispensing ambient-temperature using three tanks (room temperature, hot and cold) and appropriate solenoid valves.

It will be understood that, given separate heating and cooling switches 74a, 74b, cooling systems may be de-energized on the unit when there is only a need for ambient and hot water; conversely, heating systems may be de-energized on the unit when there is only a need for ambient and chilled water. In alternative designs, of course, the dispenser may be designed to dispense only hot and chilled water, only ambient and chilled water, only ambient and hot water, or any other combination, given use, need, climate, locale, etc.

Figure 5:
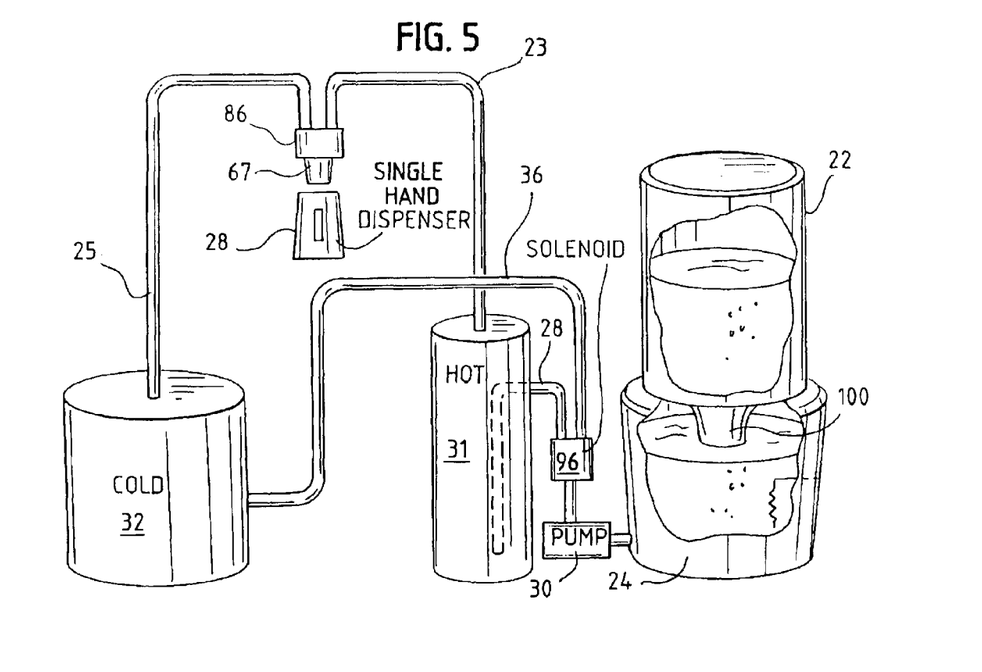
FIG. 5 is a schematic view showing an alternative water layout.
Figure 6:
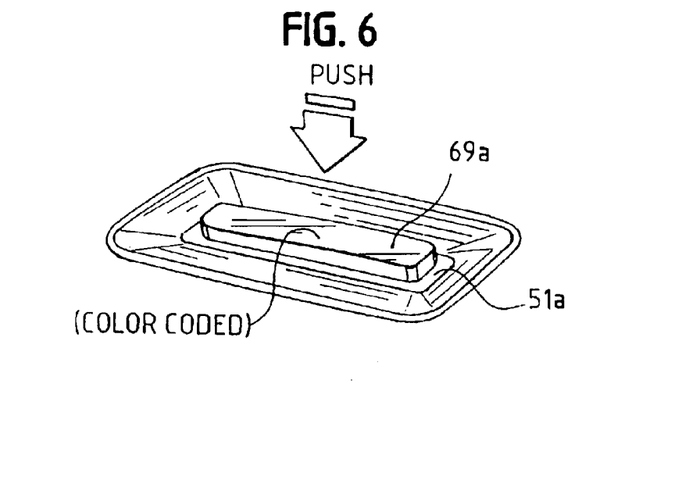
FIGS. 6–16 are perspective views of alternative embodiments for effectuating child-resistant hot water dispensing.
Figure 7:
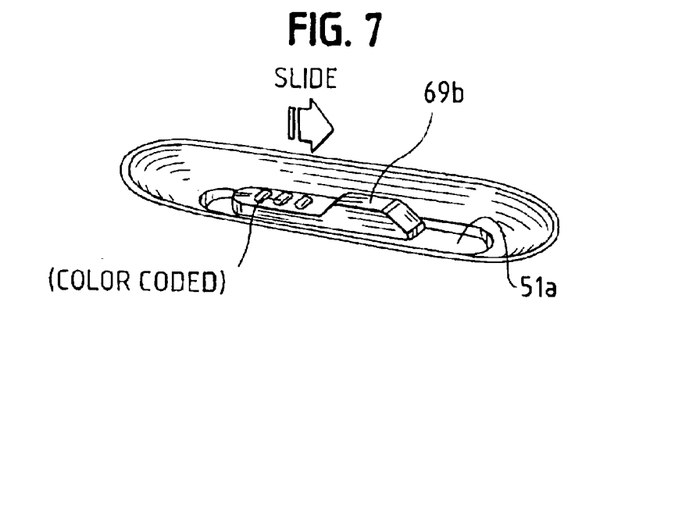
Figure 8:
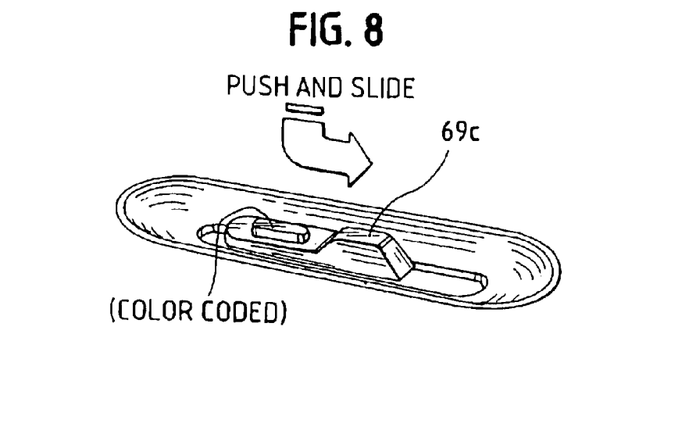
Figure 9:
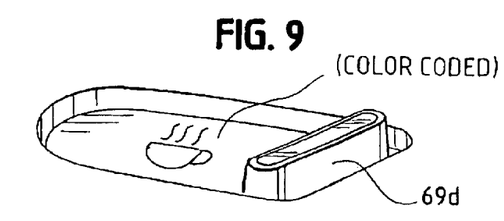
Figure 9A:
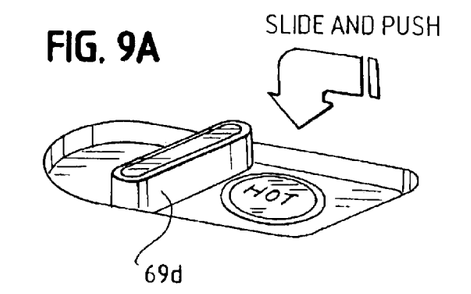
Figure 10:
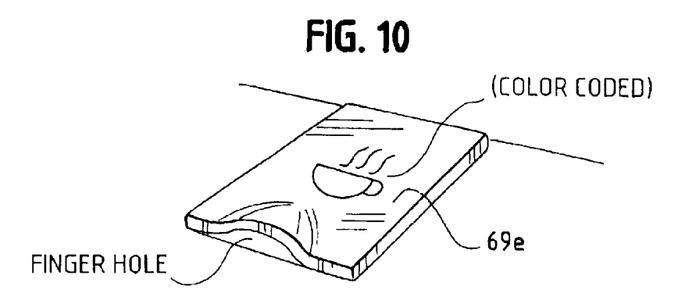
Figure 10A:
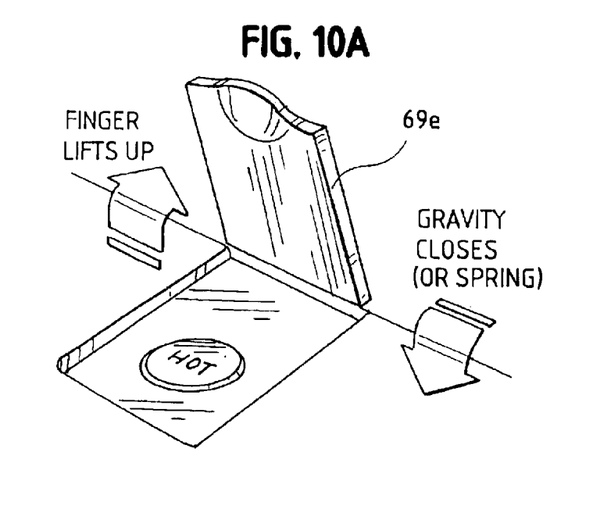
Figure 11:
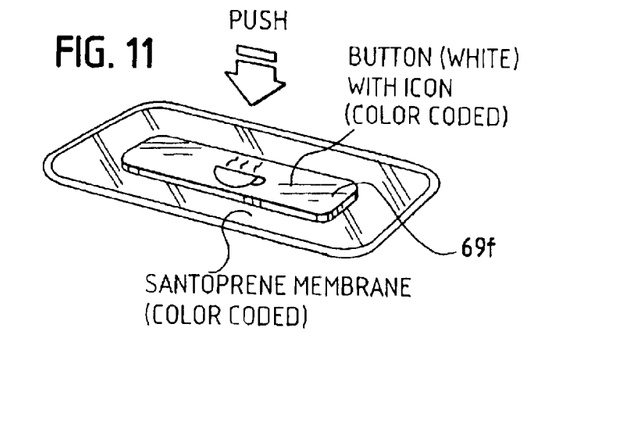
Figure 12:
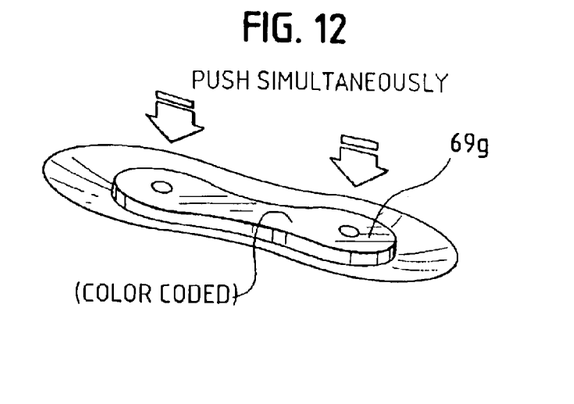
Figure 13:
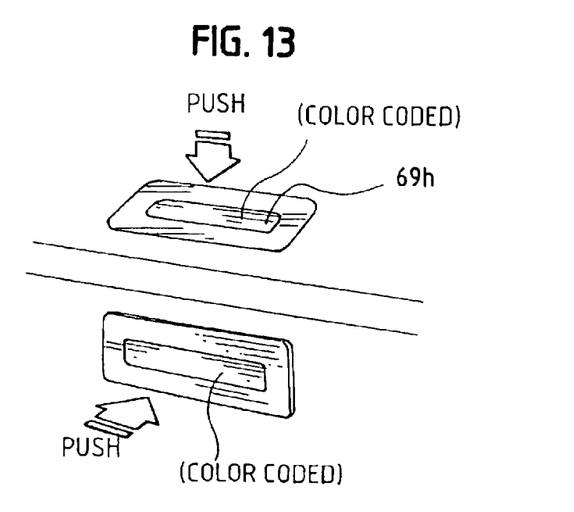
Figure 14:
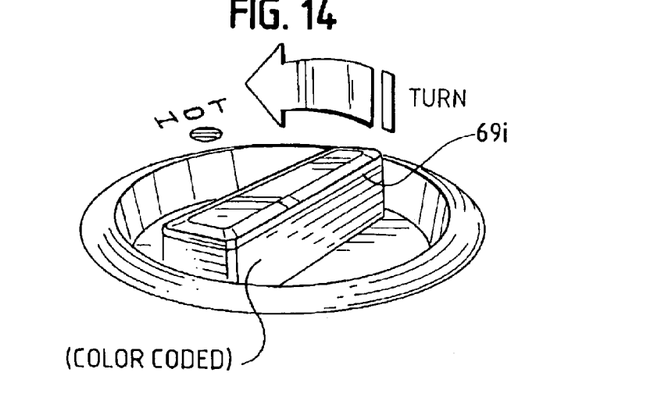
Figure 15:
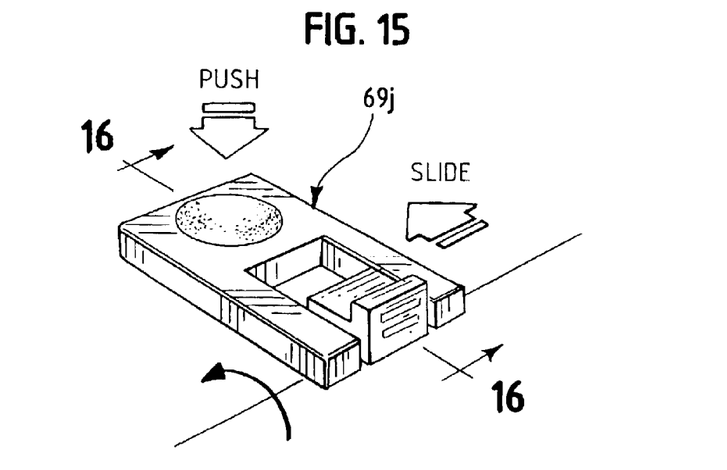
Figure 16:
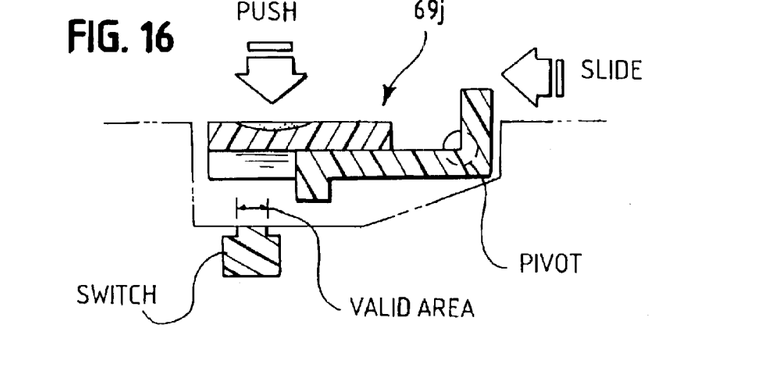

Referring now to FIG. 5, which maybe provided with the same user/dispensing interface as shown in FIGS. 1–4, an alternative yet compact water layout is provided. In this layout, a more pressurized system is provided in which ambient water is pumped from reservoir 24 either to hot tank 31 or cold tank 32, for selective dispensing as shown.

As described above, to save cost, in a preferred dispensing embodiment only a single pump may be used to provide room temperature, cold or heated water from a corresponding reservoir. A mechanically-actuated or solenoid-actuated selector, as also described above, may be provided to open the water path to provide a desired water temperature. Using a partially pressurized as opposed to completely pressurized system may be more economical. However, using a fully pressurized system powered by a wall socket plug-in would allow dispensing without using a pump.

Shutoff device 100 may consist of an automatic filter shutoff device as defined above, such that water refill is not permitted until the filter cartridge is replaced, as further described in co-pending U.S. Ser. No. 10/692,603 titled, "Bottled Water Dispenser With Shutoff, Variable Filtration Capacity and Replaceable Cartridge Filger," the disclosure of which is incorporated into this patent application in its entirety. Such a device 100 also permits selective lockout/shutdown to occur after sensing different volumetric capacities of water bottles based on varying neck sizes.

Canister 100 may include a filter cartridge using varying types of filters, such as the PureSmart® filter available from Elkay Manufacturing Company, Watertech Division, of Oakbrook, Ill. The carbon-loaded, non-woven media of the PureSmart® water filter may be used as the primary filtering mechanism. However, the carbon-loaded filter media may be too restrictive to be utilized in a simple flat configuration. As a result, for use with the present invention the filter media may be combined with a support/separation media. The combined media may be pleated to increase the available surface area within the canister. Once pleated, the pleated media pack may be die-cut to the proper diameter for insertion into the canister. A retainer ring may be inserted into the canister and a sealant may be injected onto the distribution plane of the retainer. The cartridge may then be spun in place using centrifugal force at a rate effective to direct the sealant to the peripheral edge of the filter media element without wetting the filtering surface of the filter media, as further explained in U.S. Pat. No. 5,063,926, which is incorporated by reference in this disclosure in its entirety.

It will be understood, however, that countertop dispenser unit 20 of the present invention need not be used with a filter, or with a shutoff mechanism, if not desired.

Referring now to FIGS. 6–16, alternative embodiments of dispensing actuation mechanisms 69a–69j are shown. Mechanism 69 preferably provides single-hand dispensing, but is also preferably child-resistant to prevent unintended dispensing, such as unintended hot water dispensing. Such mechanisms may require selective amounts of sliding (e.g., FIG. 7); simultaneous sliding and/or pushing or vice-versa (e.g., FIGS. 8, 9, 11 and 15); providing a hidden or concealed "hot lock (e.g., FIG. 10); pushing a selected surface or pushing simultaneous surfaces (e.g., FIGS. 11–13); or selective amounts of turning and/or coupled with pushing (e.g., FIG. 14).

Figure 20:
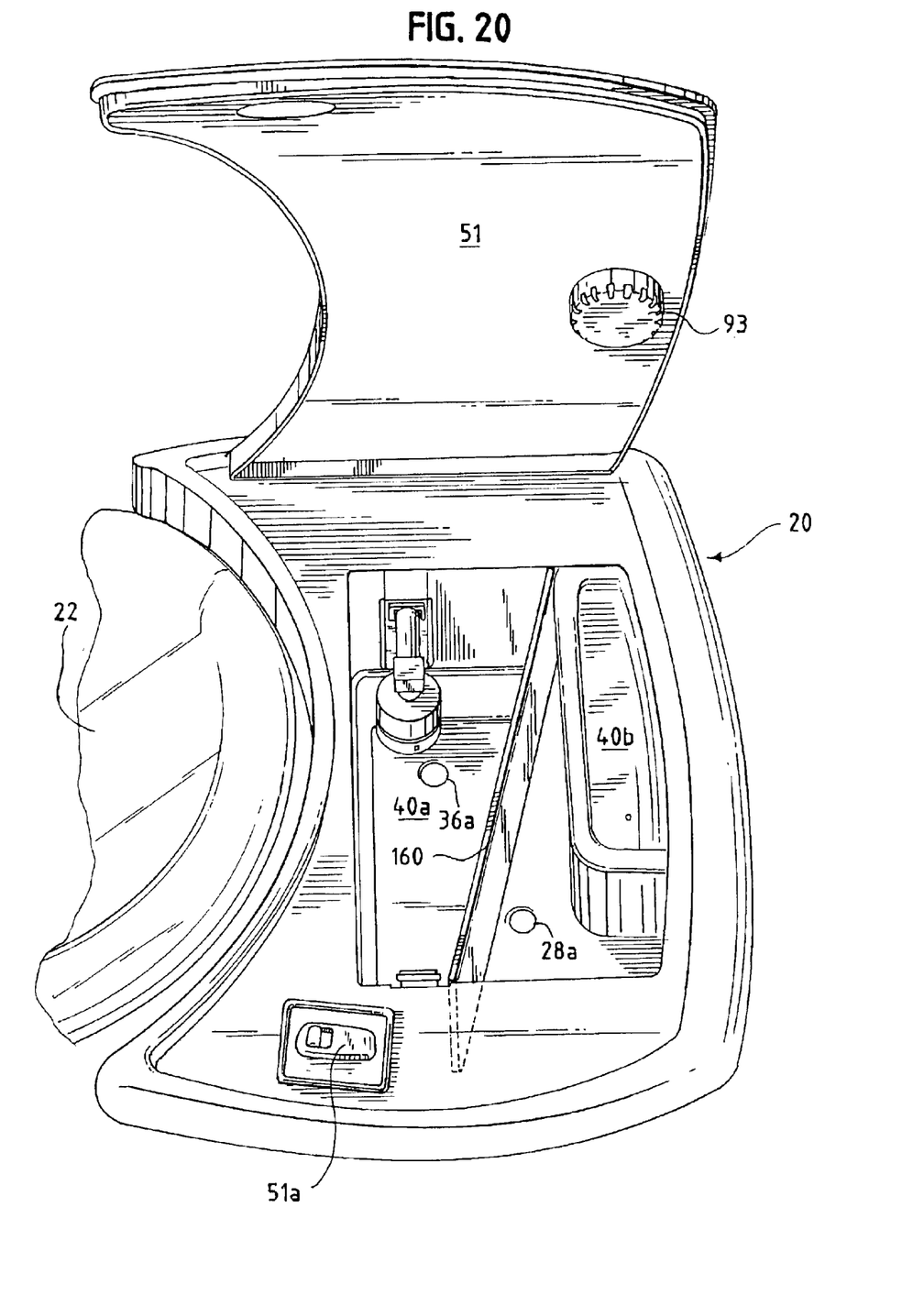
FIG. 20 is a top and side perspective view of the upper reservoir of the dispenser unit, shown with the lid open.

Referring now to FIG. 20, a suitable baffle, such as planar baffle 160, may be used to separate upper reservoir 40b into two compartments, one compartment providing water to cold tank 32 through inlet 36a and the other providing water to hot tank 31 through inlet 28a. It was found that using a baffle in this manner provided a 2° F. benefit during normal cycling of the unit. It is desired to maintain inlet water to the tanks at about ambient temperature, for optimum efficiency. Steam and hot water expansion from hot tank 31 can backflow up the inlet and into upper reservoir 32; this backwash of warmer water would without baffle 160 enter the portion of upper reservoir 40b servicing the cold tank. Thus, baffle 160 allows the cold water tank inlet temperature to be closer to ambient temperatures than it otherwise would be.

Figure 21:
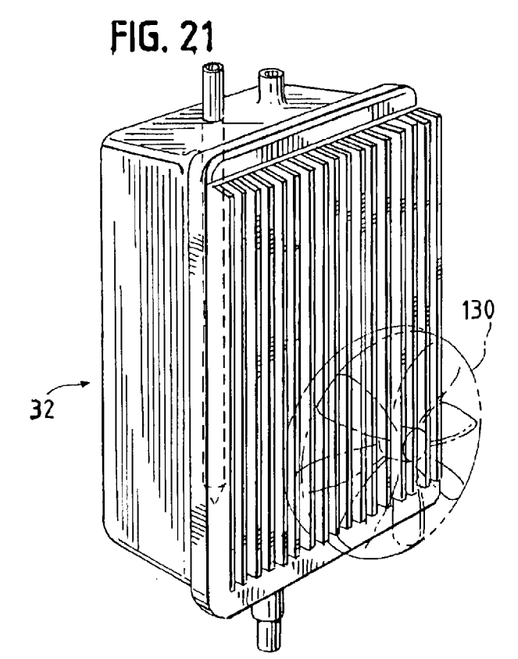
FIG. 21 is a perspective view of the cold tank, with the fan shown in dotted lines.
Figure 22:
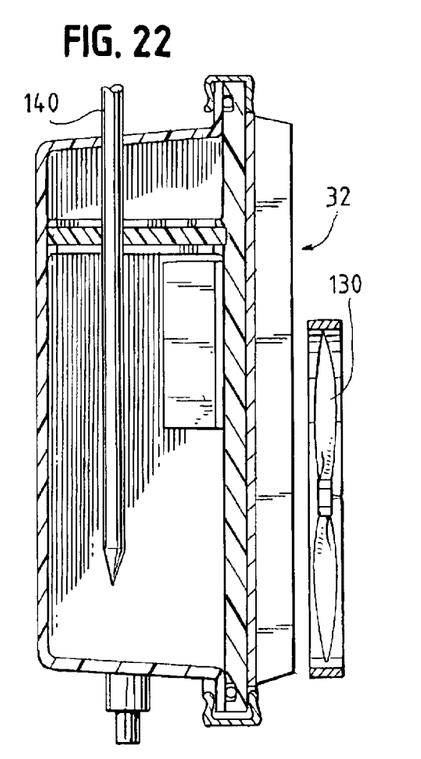
FIG. 22 is a sectional view showing the cold tank with its cover open.
Figure 23:
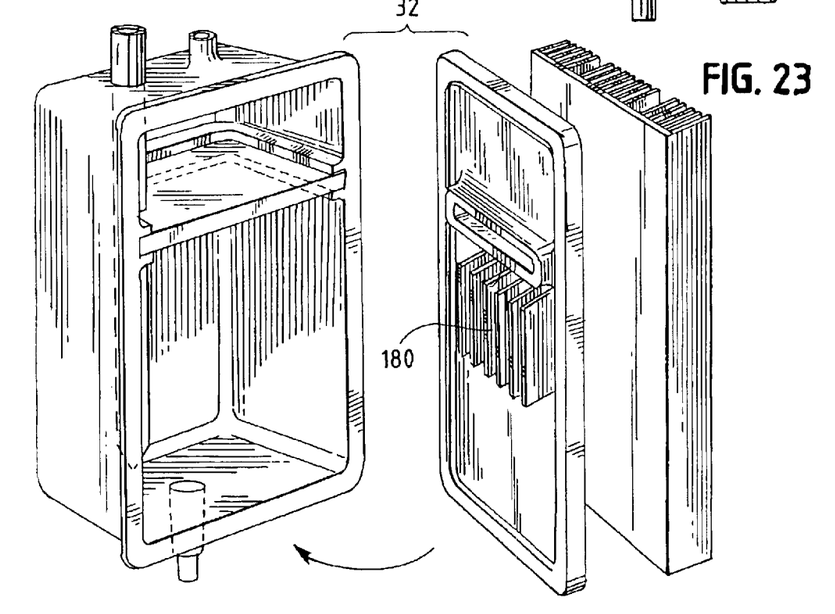
FIG. 23 is a perspective view showing the cold tank with its cover open.

Referring now to FIGS. 21–23, cold tank 32 is also preferably provided with a baffle 180, which may consist of a series of parallel plates as shown. Thermistor 140 and fan 130 are also shown. In one embodiment, an ice ball is formed within the cold tank. Baffle 180 controls the turbulence of water flowing through tank 32 and around the ice ball, ensuring that the water flow slowly disperses and evenly flows over the sides of the tank and over the ice ball within the tank. In addition, baffle 180 regulates the mixing process within the tank, and helps maintain stratified temperature layers, facilitating removal of chilled water and its replacement with the entering warmer water.

Figure 1A:
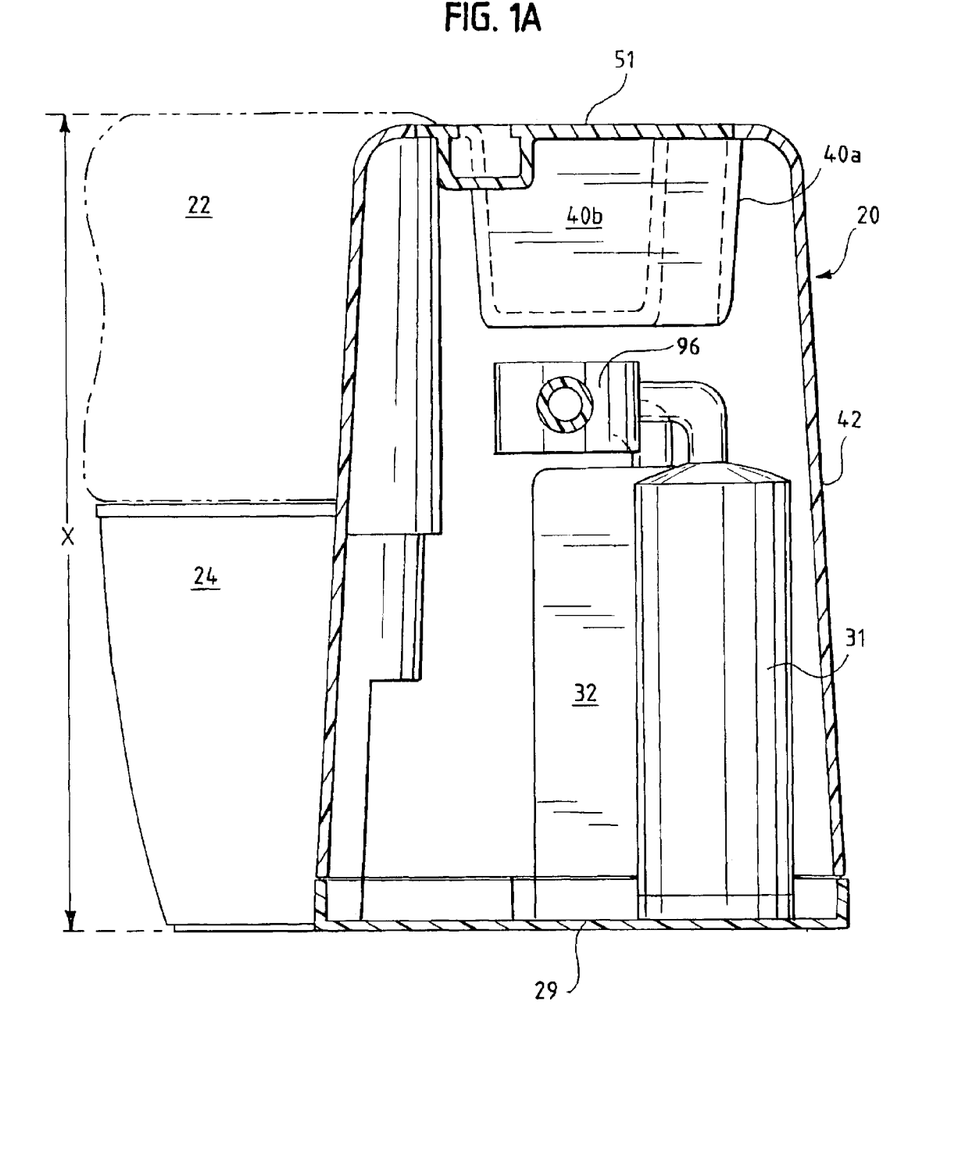
FIG. 1A is a sectional view along reference line 1A/1A of FIG. 1.
Figure 1B:
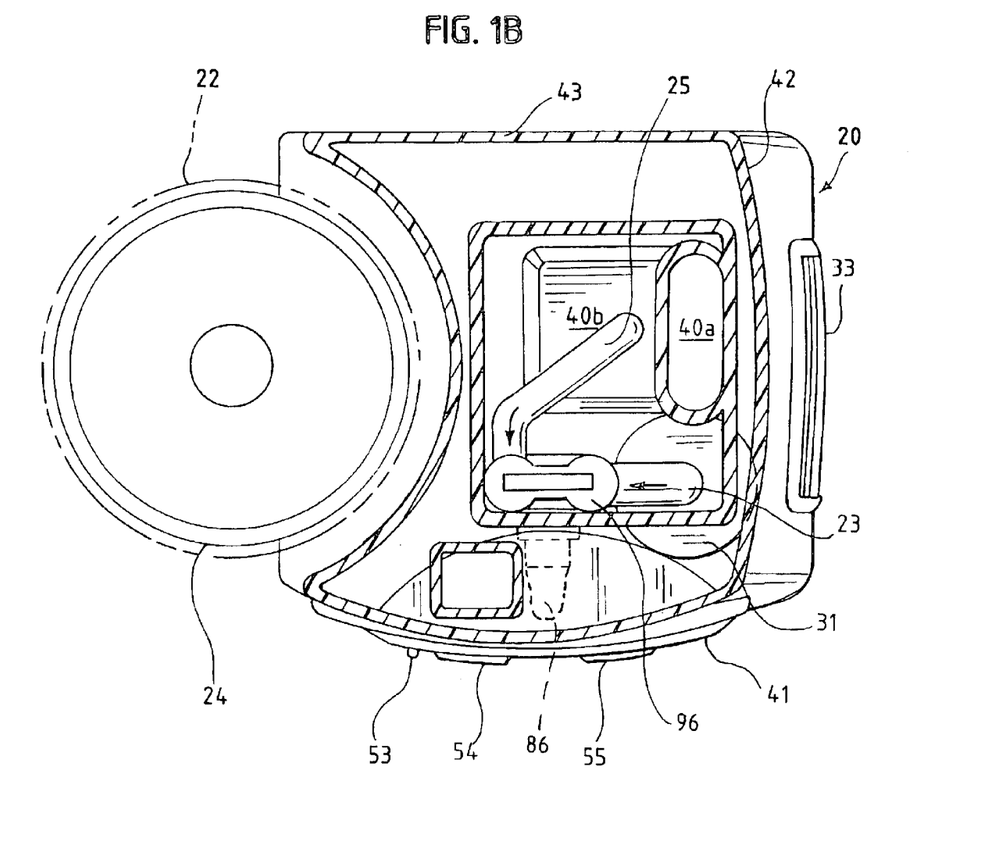
FIG. 1B is a sectional view along reference line 1B/1B of FIG. 1.

It will now be appreciated by those of ordinary skill in the art that the countertop water dispenser of the present invention has various advantages, at least some of which are now discussed in more detail. The water dispenser has a reduced unit height, preferably less than 24 inches and most preferably equal to or less than about 18 inches (which is a current architectural convention for a minimum countertop height, though such heights have varied dramatically over the years). In a preferred embodiment shown in FIG. 1, for example, a side-mounted bottle provides ease of installation and removal. The dispenser 20 height or countertop height "X" (FIG. 1A) is preferably suitably sized to allow dispenser unit 20 to fit between the kitchen countertop/kitchen cabinet space that is then industry standard. Alcove 41 is also suitably sized to easily accommodate typically-sized 16-ounce water glasses and typically-sized household pitchers. It may be desirable to utilize four reservoirs for dispensing: (1) unfiltered, room temperature water; (2) filtered, room temperature water; (3) filtered, chilled water; and (4) filtered, heated water. This is difficult given the limited counter space available. Accordingly, in a preferred embodiment reservoirs (2) and (3) may be combined, allowing significant counter space to be saved. Filtered, room temperature water may be provided by pulling water from a portion of the reservoir that is adjacent the thermoelectric area, as described above. The source for filtered, heated water may be pulled from this same area, as also described above.

Figure 17:
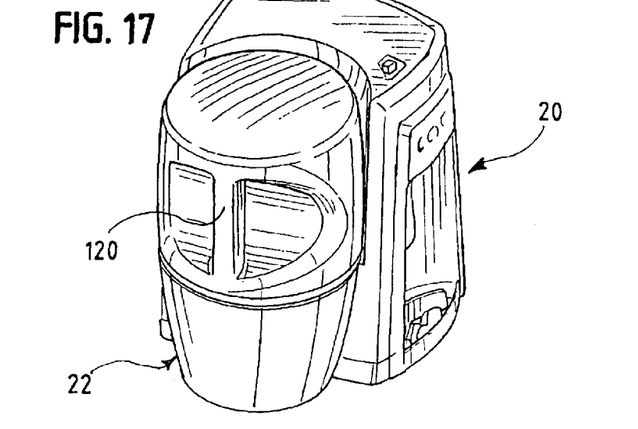
FIG. 17 is a top and side perspective view of the dispenser unit with a preferred water bottle having an integral handle.
Figure 18:
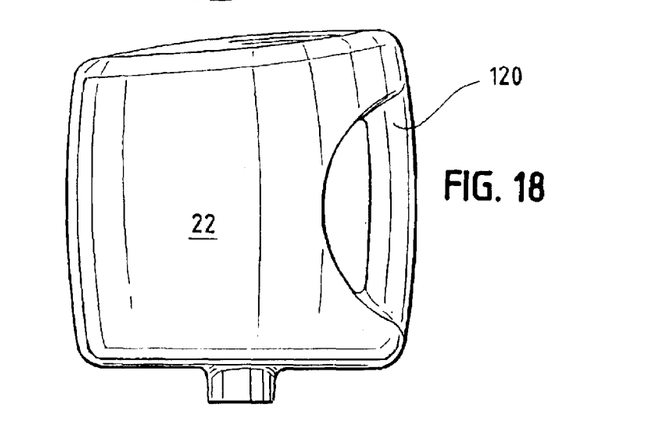
FIG. 18 is a side perspective view of the preferred water bottle with integral handle.
Figure 19:
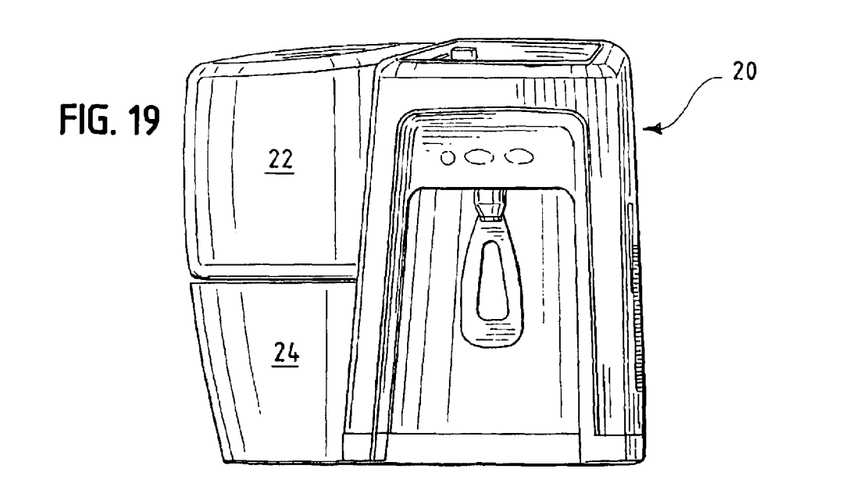
FIG. 19 is a side and top perspective view of the preferred dispenser unit from the user's vantage point.

In a preferred embodiment, an ergonomically designed handle may be used for easily lifting and carrying water bottles 22. Water bottles with side-mounted handles also provide ease of installation and removal. Referring to FIGS. 17–19, the bottle may be designed with an integral handle 120 such that the bottle may be rotated so that the handle is hidden from view as the dispenser rests on the countertop (compare FIGS. 17 and 19).

In a preferred embodiment, cooling efficiency is enhanced by drawing heat in from the side of the unit and rejecting heat from the back of the unit. A side heat rejection location also ensures that filtered and unfiltered water reservoirs will not be incidentally heated which would undesirably further retard the cooling process. An air filter may be used to remove dust particles from passing into the unit. The cooling efficiency of a dispensing unit powered by thermoelectrics is directly proportional to its ability to reject heat generated by its thermoelectric source (i.e., the cooler the "hot" side can be maintained, the colder the "cold" side can be maintained). It was found that the likelihood of blockage (due to pushing unit to back of wall, for example) and the resulting loss of ability to reject heat is lower when heat rejection takes place at the side of the dispenser rather than the back. It is also not desirable to reject heat from the top of the unit, as that can generate dust and wind in the face of nearby persons. In a preferred embodiment, a thermoelectric module may be used as a thermoelectric heat sink available, for instance, from Shunde Fuxin Electrical Appliance Industry Company Limited, No. 11, Hongfengd., Lifeng Industry Area, Rongli, Ronggui Town, Shunde, China. In one preferred embodiment, the cooling chip of the thermoelectric unit was a 75 watt chip. On the cold side a small heat sink may be located. On the hot side a large heat sink (e.g., aluminum-sided) may be used, with a fan to dissipate heat. At 115 volts, the thermoeletric unit of one embodiment generally drew between about 80–95 watts. The unit ran at about 1.1–1.3 amps. The hot tank used either a 320-watt or 400-watt heating element. Amperage of both cold and hot tanks is about 4.5–5 amps. Target cooling ranges are about 35–55° F.

Mounting feet (not shown) may be located on the underside of countertop dispensing unit 20, allowing the user to pull the unit out from underneath a cabinet to more easily remove or install a water bottle or pitcher. Mounting feet are preferably made of a suitable, low friction material such as Teflon, which slides easily and will not mar or scratch a countertop surface.

A thermal cutoff is also preferably provided, to ameliorate burn and fire safety concerns. A high temperature cutoff, preferably selected below the boiling point of water (e.g., 200° F.), is preferably integrated with a thermal run-away cutoff. Such a redundant system provides enhanced safety against electrical fires, for example. Preferably, the dispenser unit has a 15 amp maximum current draw (house fuses are typically triggered at either 15 or 20 amps). In a preferred embodiment, for example, a maximum cold water temperature of 52° F. may be provided, and a minimum hot water temperature of 170° F. may be provided.

It is obviously desirable to prevent freeze-up of the exit tube/cold tank outlet hose 25 from cold tank 32, and a suitable heating element (e.g., a heating coil selectively powered by a solenoid or microswitch) may be provided for this purpose. An adjustable thermostat or winter/summer switch may also be used for this purpose. While it may be desirable to have some ice build-up within the cold tank, to prevent excessive ice formation a suitable mechanism, such as a photoeye, may be used to monitor this. Preferably, optimum cooling temperatures are maintained by by cycling the unit, i.e., bringing the temperature up and down, by changing fan speed. A fan (not shown) in the rear of dispenser unit 20 removes heat from the unit. By modulating the fan speed (e.g., at 2200 RPM, down to 750 RPM, and then back to 2200 RPM) around a set point (e.g., +/−2° F.), optimum cooling conditions maybe obtained in an efficient manner. In one embodiment, the fan was operated at 2200 RPM for about 15% of the time. Preferably, continuous cycling using fan modulation occurs, as this is presently believed to provide higher efficiencies and performance. Cycling saves on the life-cycle of the unit. In addition, it is believed to be more energy efficient. In one embodiment, the thermoelectric unit drew 96 watts of power, about 1.2 amps, while the hot tank drew about 400 watts of power.

Using the principles and features of the present invention, including a thermoelectric unit as described above, cold and hot tanks may be located in close location to each other, with appropriate chilling and heating as described, and further described below.

Additional features are preferably provided. These include a removable drip tray 60 (FIG. 2), preferably designed to be dishwasher-safe either from detergents or temperatures, which allows removal to facilitates cleaning and/or to accommodate taller containers. Also, the cold reservoir preferably has a minimum capacity of 33-ounces, which will allow filling of four, 8-ounce cups. Similarly, the hot reservoir preferably has a minimum capacity of 28 ounces, allowing the filling of four, 7-ounce cups. Lower reservoir 24 may be provided with a minimum desired capacity (e.g., 100 ounces), while upper reservoirs 40a, 40b may also be appropriately sized to effectuate the unit's dispensing purposes. The capacity of the water bottle or water pitcher may preferably be limited by the weight of water that must be carried and lifted above the countertop surface. This capacity is balanced against the number of fills needed per week. While a 2-gallon or 3-gallon water bottle, or a 64-ounce water pitcher, may be suggested maximum capacities, this may vary depending on the use (e.g., dispenser located in nursing home where elderly may use, versus one located at a high school, etc.).

Referring to FIG. 2, a single-piece base 29 may be used, serving as a "z-axis" base to facilitate bottom-up assembly, limiting the need to flip over the unit during assembly.

Dispenser 20 components are preferably injection molded and/or blow-molded, may be but need not be antibacterial, preferably minimize noise produced during use, and are preferably compliant with appropriate industry standards, such as UL, NSF, CE and CUL.

In a preferred embodiment, a dispensing and filtering system according to the present invention includes several already-described and/or additional features convenient to the consumer, including: (1) a clear bottle for visual verification of water level; (2) mounting feet enabling the consumer to pull the cooler away from the wall to refill a bottle; (3) 2-gallon bottle with a handle for lifting the bottle up and away from the countertop-disposed cooler; (4) an easily replaced filter system which automatically prohibits engagement with a new water bottle when the filtration capacity is met; (5) a dispenser capable of being pre-set for cold water dispensing for dispensers having hot/cold water, and pre-set for ambient water dispensing for dispensers having hot/ambient water; (6) one-hand but preferably child-safety dispensing provided by, e.g., a paddle, button or switch (e.g., hot water dispensing may first require the consumer to press and/or hold down a safety button).

Preferably, although not required, the following product design features may be provided for aesthetic reasons: (1) exterior components injection molded, of ABS or PC; (2) injection molded exterior parts to be Class A with #2 SPI-SPE finish; (3) vent rear or underneath unit; (4) injection or blow-molded 2-gallon clear bottle made of ABS, polycarbonate, PET, SAN, PP or PVC materials; (5) green/power, red/hot and blue/cold indicator lights; (6) have compact dimensions for placement on a countertop surface and beneath kitchen cabinets (e.g., 16.5" by 15.6" h by 12.5" d; and (7) static and UV resistant cabinet construction, including scratch resistant feet to avoid scraping kitchen countertops.

While system performance will obviously vary based on unit size, power requirements, consumer need, etc., in one preferred embodiment cold system performance (at 75° F.) was tested as follows: first 6 oz draw of <=44° F.; three 6 oz draws of <=52° F.; cold water volume of 32 oz; 30–40 minute recovery from 75° F. to 44° F.; and a dispense rate not greater than 0.5 GPM, and not less than 0.3 GPM. In this preferred embodiment, hot system performance (again tested at 75° F.) was tested as follows: child safety feature and hot tank switch; first 6 oz draw of 190° F.+/−3° F.; hot water volume of 42 oz; four 10 oz draw >=170° F.; 20 minute recovery from 75° F.–190° F.; dispense rate not greater than 0.3 GPM, and not less than 0.25 GPM; temperature adjustability on rear of unit; and non-drip faucet. In this preferred embodiment, ambient water performance features included: ambient temperature +/3° F.; and ambient water volume of 100 oz.

While engineering/quality related performance obviously may vary depending upon particular state codes, desired features, etc., in a preferred embodiment the following performance criteria was provided: 3-year design life; meets FDA requirements for non-contamination; met manufacturer taste and odor specifications; drip tray is dishwasher safe; PCB enclosure made with a V0 fire-rated material; cooler noise<65 db, at the front of the unit while on a standard countertop; NSF component listing for filter, UL/CSA/CUL certification; and sufficient condensation testing.

It will be understood that dispensing units with alternative functions may be designed according to the principles of the present invention. For exanple, a filtering unit dispensing only ambient water may be employed. Alternatively, filtering units dispensing hot/cold, ambient/cold and ambient/hot temperature water may also be employed, in addition to the unit described above dispensing ambient/cold/hot water. Preferably, each unit is designed with a filtering function. Touch switches for hot and cold water, and child-resistant safety switches for hot water, are preferably employed.

The above description is not intended to limit the meaning of the words used in the following claim that define the invention. Rather, it is contemplated that future modifications in structure, function or result will exist that are not substantial changes and that all such insubstantial changes are intended to be covered by following claims.

We claim:

1. A water dispenser, comprising:
    a first reservoir in liquid communication with a water container, the water container being mounted on the side of the dispenser;
    a second reservoir in liquid communication with the first reservoir, and with each of a hot tank and a cold tank, wherein water from the second reservoir fills and replenishes the hot tank and the cold tank;
    a dispensing mechanism for dispensing hot water using a child-resistant actuator;
    wherein the water dispenser has countertop dimensions, including a countertop height.

2. The water dispenser of claim 1, wherein the dispensing mechanism is capable of selectively dispensing chilled or hot water.

3. The water dispenser of claim 1, wherein the dispensing mechanism is capable of selectively dispensing room-temperature, chilled or hot water.

4. The water dispenser of claim 1, wherein water may be dispensed using a single hand.

5. The water dispenser of claim 1, wherein the child-resistant actuator requires two hands to actuate.

6. The water dispenser of claim 1, further comprising a filter for filtering the water prior to dispensing.

7. The water dispenser of claim 6, further comprising an automatic filter shutoff device.

8. The water dispenser of claim 7, wherein the automatic filter shutoff device senses water containers with differing volumetric capacities and adjusts its shutoff capabilities accordingly.

9. The water dispenser of claim 1, wherein the second reservoir comprises at least two separate reservoirs, one of which receives steam or expanded hot water from the hot tank.

10. The water dispenser of claim 1, further comprising a fan located at the rear of the dispenser for use in removing heat from the dispenser.

11. The water dispenser of claim 10, wherein the speed of the fan is modulated around a set point temperature range to facilitate maintaining the water in the cold tank within a desired range.

12. The water dispenser of claim 1, wherein the dispenser includes a cooling system powered by a thermoelectric device.

13. The water dispenser of claim 1, further comprising separate switches for energizing heating and cooling systems within the dispenser, enabling dispensing of chilled water without energizing the heating system, and enabling dispensing of hot water without energizing the cooling system.

14. The water dispenser of claim 1, further comprising a check valve positioned in liquid communication between the hot tank and the second reservoir for preventing hot water from flowing from the hot tank back into the second reservoir.

15. The water dispenser of claim 1, further comprising solenoid valves for selectively enabling and disabling the flow of water from the hot and cold tanks.

16. The water dispenser of claim 1, wherein the cold tank includes a baffle facilitating the separation of hotter and colder water within the tank, and helping to minimize water turbulence within the tank.

17. The water dispenser of claim 1, wherein the second reservoir includes a baffle for separating water flowing into the cold tank and water flowing into the hot tank, facilitating the provision of cold tank water inlet temperatures which are closer to ambient temperatures than would otherwise be the case without a baffle.

18. A process for dispensing water from a dispenser unit having countertop dimensions, including a countertop height, and located on a countertop, comprising:
    placing a water container in liquid communication with a first reservoir;
    placing a second reservoir in liquid communication with the first reservoir, and with each of a hot tank and a cold tank;
    filling the hot and cold tanks using water supplied from the second reservoir;
    filling the second reservoir from using water supplied from the first reservoir;
    maintaining a predetermined amount of water within the first and second reservoirs during dispensing; and
    enabling child-resistant dispensing of hot water using a child-resistant actuator.

19. The process of claim 18, further comprising the step of providing a fan for removing heat from the dispenser, and modulating fan speed around a set point temperature range to facilitate maintaining the water in the cold tank within a desired temperature range.

20. The process of claim 19, wherein the fan is continuously cycling when the dispenser unit is energized.

21. The process of claim 18, further comprising the step of causing steam from the hot tank to be released into the second reservoir.

22. The process of claim 18, further comprising the step of mounting the water container on a side adjacent the dispenser.

23. The process of claim 18, wherein the step of maintaining a predetermined amount of water within the reservoirs is accomplished using float switches.

* * * * *